(12) United States Patent
Osonoi et al.

(10) Patent No.: US 7,628,245 B2
(45) Date of Patent: Dec. 8, 2009

(54) VEHICLE STEERING APPARATUS

(75) Inventors: Tetsuya Osonoi, Kanagawa (JP); Takaaki Eguchi, Kanagawa (JP); Naotaka Chino, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 345 days.

(21) Appl. No.: 11/318,910

(22) Filed: Dec. 27, 2005

(65) Prior Publication Data

US 2006/0169519 A1   Aug. 3, 2006

(30) Foreign Application Priority Data

Dec. 28, 2004   (JP) ............................. 2004-380951

(51) Int. Cl.
    *B62D 5/00*   (2006.01)
(52) U.S. Cl. .................. 180/405; 180/403; 180/444
(58) Field of Classification Search ................. 180/403, 180/405, 444
    See application file for complete search history.

(56) References Cited

U.S. PATENT DOCUMENTS

| | | | |
|---|---|---|---|
| 6,580,989 B1 * | 6/2003 | Husain et al. .................. 701/41 |
| 7,004,279 B2 * | 2/2006 | Shitamitsu et al. ........... 180/402 |
| 7,308,964 B2 * | 12/2007 | Hara et al. .................. 180/446 |
| 7,322,439 B2 * | 1/2008 | Hara et al. .................. 180/402 |
| 2003/0141134 A1 | 7/2003 | Sherwin et al. |
| 2004/0238258 A1 * | 12/2004 | Ono et al. .................... 180/402 |
| 2005/0045413 A1 * | 3/2005 | Shitamitsu et al. ........... 180/402 |
| 2005/0279562 A1 * | 12/2005 | Hara et al. .................. 180/402 |

FOREIGN PATENT DOCUMENTS

| | | |
|---|---|---|
| DE | 199 41 535 A1 | 3/2001 |
| EP | 1 520 767 A2 | 1/2005 |
| EP | 1 607 303 A2 | 12/2005 |
| JP | 2002225733 | 8/2002 |

* cited by examiner

*Primary Examiner*—Paul N Dickson
*Assistant Examiner*—Tashiana Adams
(74) *Attorney, Agent, or Firm*—Young Basile

(57) ABSTRACT

A vehicle steering apparatus with improved safety securely detects whether or not a backup system is operable and comprises a steering shaft connected to the steering wheel; a reaction actuator connected to the steering shaft for adding a reaction force; a rack for steering a steered wheel; a steering actuator provided on the rack; a backup mechanism for connecting the steering shaft and the rack via a clutch, a first detection means or mechanism for detecting the condition of the steering shaft, a second detection means or mechanism for detecting the condition of the rack, and a backup operation monitoring means or mechanism for driving the steering actuator when the power source is energized, the backup operation monitoring means or mechanism selectively monitoring the operation of the backup mechanism based on the value detected by the first detection means or mechanism or the second detection means or mechanism or both.

17 Claims, 8 Drawing Sheets

VEHICLE STEERING APPARATUS

RELATED APPLICATION

The disclosure of Japanese Patent Application No. 2004-380951, filed Dec. 28, 2004, including its specification, claims and drawings, is incorporated herein by reference in its entirety.

FIELD

Described herein is a vehicle steering apparatus, and more particularly, a steering apparatus operated by steer-by-wire control and having a backup system.

BACKGROUND

Conventional vehicle steering technology of the type employs so-called steer-by-wire control, and the steering wheel and the steered wheels are connected by a clutch. In the normal condition, however, the steering wheel and the steered wheels are mechanically separated by releasing the clutch, and steering is carried out by driving an actuator connected to the steered wheels by detecting the steering manually exercised by the driver. A backup system is provided to engage the clutch and secure manual steering by mechanically connecting the steering wheel and the steered wheels.

However, in the prior art, the backup system operates only during a failed condition, and therefore steer-by-wire control may be initiated even when the backup system is in an abnormal condition. Consequently, the backup system cannot be guaranteed to operate in the failed condition.

SUMMARY OF THE INVENTION

The present steering apparatus takes into account the above-described problem, and provides improved safety by securely detecting whether or not the backup system is operable.

The present vehicle steering apparatus comprises a steering shaft connected to the steering wheel; a reaction actuator connected to the steering shaft for adding a reaction force; a rack for steering a vehicle wheel; a steering actuator provided on the rack; and a backup mechanism connecting the steering shaft and the rack via a clutch. A first detection means or mechanism is provided for detecting the condition of the steering shaft, and a second detection means or mechanism is provided for detecting the condition of the rack. The clutch is in an engaged condition when the power source of the steering apparatus is deenergized. A backup operation monitoring means or mechanism is provided for driving the steered actuator when the power source is energized and for monitoring the operation of the backup mechanism based on the detected value by the first detection means or mechanism and/or the second detection means or mechanism.

BRIEF DESCRIPTION OF THE DRAWINGS

Further features and advantages of the present vehicle steering apparatus will be apparent from the following detailed description in conjunction with the accompanying drawings, in which.

DETAILED DESCRIPTION OF THE ILLUSTRATED EMBODIMENTS

Figure 1:
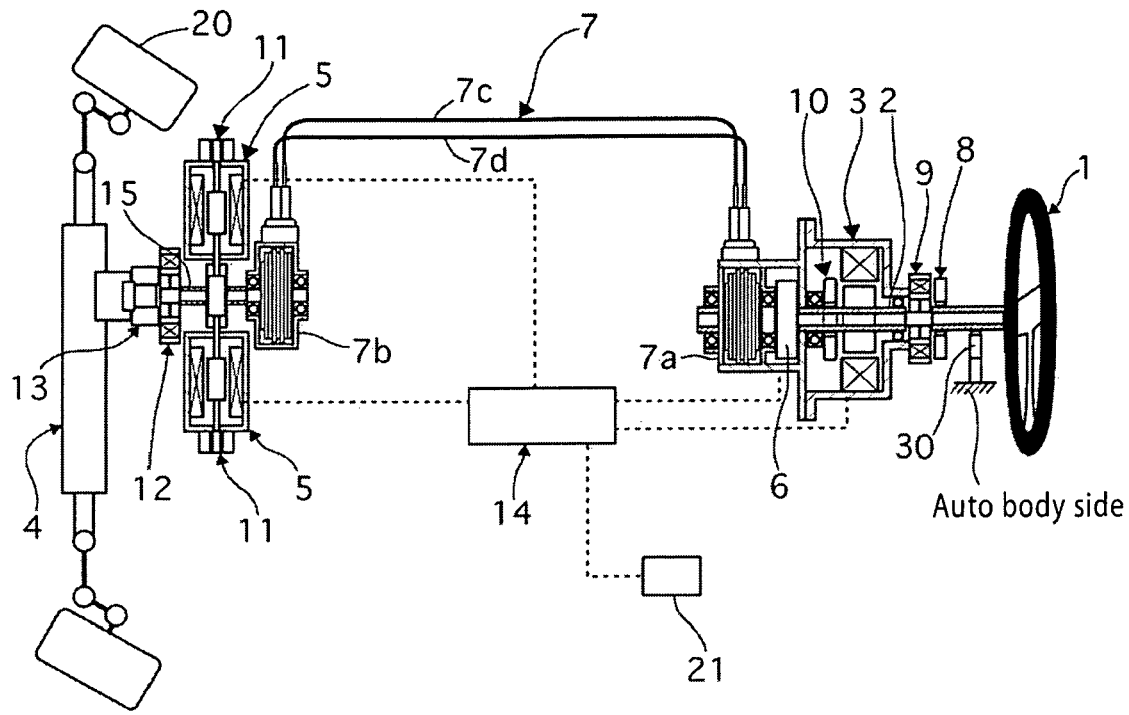
FIG. 1 is a schematic view showing the present vehicle steering apparatus.

FIG. 1 is a schematic view of the present vehicle steering apparatus having a steering side at the right-hand portion of the figure near a steering wheel 1, and a steered side at the left-hand portion of the figure near a steered wheel 20 of the vehicle. The apparatus includes the steering wheel 1 and a steering shaft 2 rotatably supported on the vehicle body and connected to the steering wheel 1. On the steering shaft 2 is a steering angle sensor 8 that detects steering angle as the degree of steering by the driver, and a torque sensor 9 that detects steering torque as the degree of steering by the driver.

On the steering side is a reaction motor 3 that adds steering reaction to steering input generated by the driver's operation of steering wheel 1. A steering side resolver 10 is provided in the steering motor 3 for detecting the rotation angle of the reaction motor 3. Also on the steering side is an electromagnetic clutch 6 for physically engaging and releasing a connection between the steering shaft 2 and a backup mechanism 7.

The backup mechanism 7 comprises a steering side cable pulley 7a having one end thereof connected to the electromagnetic clutch 6; a steered side cable pulley 7b having one end thereof connected to a pinion shaft 15; and two cables 7c and 7d that connect both cable pulleys 7a and 7b in a condition in which they are coiled in opposite directions from each other. When the electromagnetic clutch 6 is released, the rotation of the steering shaft 2 is not transmitted to the pinion shaft 15.

When the steering wheel 1 is rotated in one direction while the electromagnetic clutch 6 is engaged, one of the two cables 7c and 7d transmits the steering torque input from the driver, and the other cable transmits the reaction torque input from the steered vehicle wheel 20, thereby performing a function equivalent to that of the steering shaft 2.

For steering the steered wheel 20, the pinion shaft 15 is rotatably supported on the vehicle body and one end thereof is connected to the steered wheel cable pulley 7b. A steered motor 5, a steered side resolver 11, a steered side torque sensor 12, and a rotary encoder 13 are provided on the pinion shaft 15.

The steered motor 5 provides steered torque to the pinion shaft 15, and the steered side resolver 11 detects the rotation angle of the steered motor 5. The steered side torque sensor 12 is provided between the steered motor 5 and steered vehicle wheel 20 for detecting the rotational torque of the pinion shaft 15. The rotary encoder is provided to detect the rotational angle of the pinion shaft 15.

On the steered wheel side of the pinion shaft 15, a rack and pinion mechanism (not shown) is provided for effecting the steering of the steered wheel 20 by moving the steering rack 4 in the axial direction.

A lock mechanism 30 that limits rotation of the steering wheel 1 is provided on the steering shaft 2 to prevent the steering wheel 1 from rotating during initial monitoring.

Figure 2:
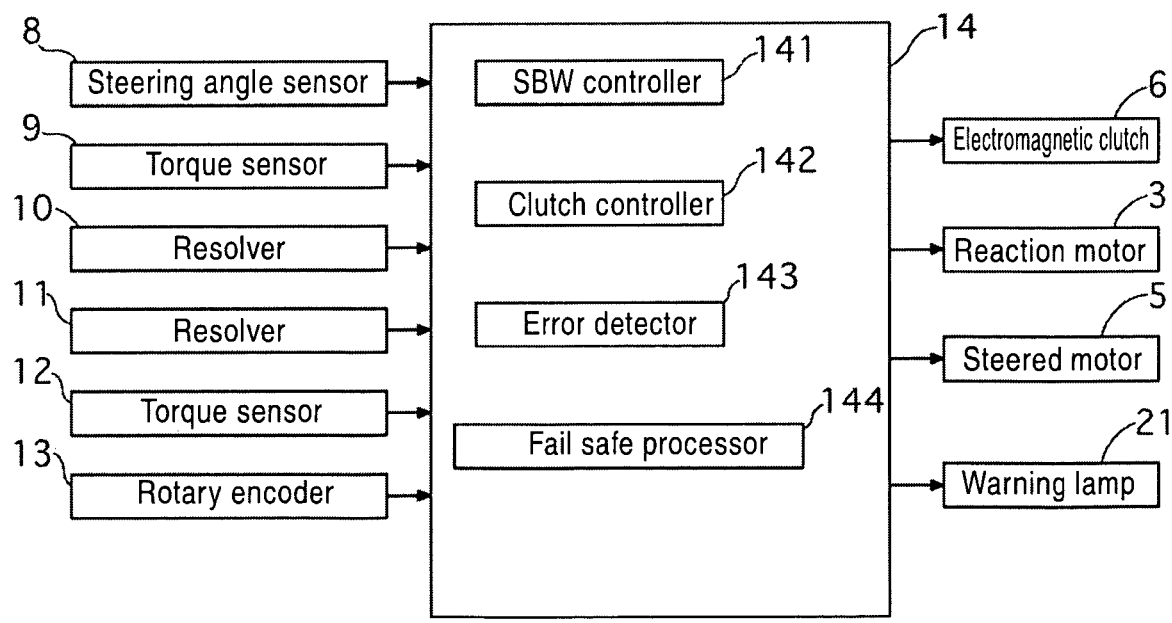
FIG. 2 is a block diagram of a control unit of the vehicle steering apparatus of FIG. 1.

FIG. 2 is a block diagram showing the structure of the control unit 14. The control unit 14 comprises a steer-by-wire controller 141, a clutch controller 142, an error detector 143, and a fail-safe processor 144.

The steering angle, steering torque and reaction motor rotation angle are inputs from the steering angle sensor 8, steering side torque sensor 9 and steering side resolver 10, respectively. In addition, the steered motor rotation angle, steered torque, and pinion shaft rotation angle are inputs from the steered side resolver 11, steered side torque sensor 12 and rotary encoder 13, respectively, as well as there being sensor signals, etc., that are inputs from other sensors (vehicle speed sensor, yaw rate sensor, lateral acceleration sensor, etc.)

The steer-by-wire controller 141 generates a control signal so that the steering reaction torque corresponding to the driving condition is added to the reaction motor 3. The steer-by-wire controller also generates a control signal so that the amount of steering corresponding to the driving conditions and the steering condition imposed by the driver are added to the steered motor 5.

The clutch controller 142 effects engagement and release of the electromagnetic clutch 6. It releases the electromagnetic clutch 6 while executing the normal steer-by-wire control and it engages the electromagnetic clutch 6 when the ignition is turned off (when the power is off) or during fail-safe control.

The error detector 143 effects the initial monitoring control that determines whether or not the backup mechanism 7 is working normally. In the first embodiment, both the reaction motor 3 and steered motor 5 are driven at the same torque T in such a direction that each other's torque is offset, and the detected values T1 and T2 of the steering side torque sensor 9 and 12 are compared. If the error between T1 and T2 is within the predetermined range, it determines that the torque transmission of the steering side and steered side are being carried out via backup mechanism 7 without any abnormality, and the normal steer-by-wire control is executed.

The fail-safe controller 144 carries out the fail-safe control when the error detector 143 determines that the error is outside the predetermined range. In the first embodiment, after the warning lamp 21 is lit, an appropriate operation is performed, such as preventing the vehicle from starting or setting off an alarm device.

In order to determine whether the backup mechanism 7 is operating without any abnormality, the error detector 143 effects the initial monitoring control. In order to secure manual steering in the case of failure while parking, the electromagnetic clutch 6 is in an engaged condition when the ignition is turned off. In the first embodiment, an arbitrary torque T is first generated at the reaction motor 3, and the same torque value T is transmitted to the counter steered motor 5. At this time, torque T is such that the steered wheel 20 does not effect steering; more specifically, it is a smaller torque than the road surface reaction torque of the steered wheel 20. In this way, the steered wheel 20 will not be turned by the initial monitoring control and therefore causes no anxiety for the driver.

At this time, the detected values T1 and T2 of the steering side and steered side torque sensors 9 and 12 are compared and if the error between T1 and T2 is within the predetermined range, it is determined that the torque transmission of the steering side and steered side is being carried out via the backup mechanism 7 without any abnormality, and the normal steer-by-wire control is executed.

When the error between detected T1 and T2 is outside the predetermined range, it determines that there is abnormality in the torque transmission via the backup mechanism 7, and manual steering has failed, so that a fail-safe operation is performed, such as preventing the vehicle from starting or the setting off of an alarm device.

Figure 3:
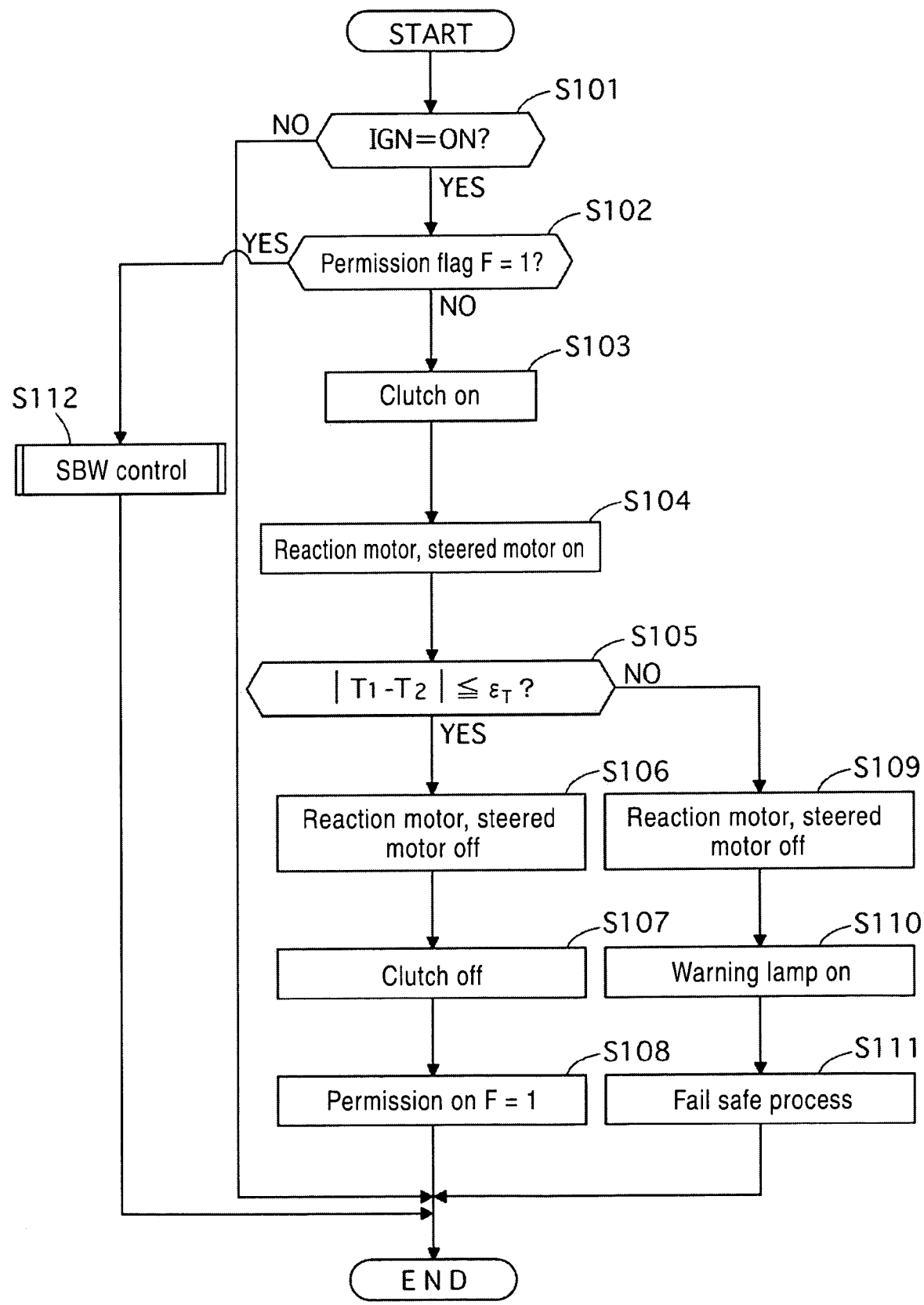
FIG. 3 is a flowchart showing an initial monitoring control process according to a first embodiment.

FIG. 3 is a flowchart showing the initial monitoring control process according to the first embodiment. Each step is described as follows.

At step S101, it is determined whether or not the ignition is turned on. If it is YES, the process advances to step S102 and if it is no, the control is terminated.

At step S102, it is determined whether or not the steer-by-wire control permission flag is established. If it is YES, the process advances to step S112, and if it is NO, it advances to step S103.

At step S103, the electromagnetic clutch 6 is energized and the process advances to step S104.

At step S104, the reaction motor 3 and steered motor 5 are turned on, torque T is generated for each of them and then the process advances to step S105.

At step S105, it is determined whether the relative error of the detected values T1 and T2 of the steering side and steered side torque sensors 9 and 12 is within the predetermined value $\epsilon_T$. If it is YES, the process advances to step S106, and if it is NO, it advances to step S109. This predetermined value $\epsilon_T$ is configured by taking into account the offset value of the torque, the friction of the backup mechanism 7, etc.

At step S106, the reaction motor 3 and the steered motor 5 are turned off and the process advances to step S107.

At step S107, the electromagnetic clutch 6 is released and the process advances to step S108.

At step S108, the steer-by-wire control permission flag is established and the control is completed.

At step S109, the reaction motor 3 and the steered motor 5 are turned off and the process advances to step S110.

At step S110, the warning lamp is turned on and the process advances to step S111.

At step S111, the fail-safe processing is carried out and the control is completed. With the fail-safe processing, the driver's attention can be attracted by an alarm, etc., or safety can be ensured by not starting the engine even if the ignition is turned on.

At step S112, the steer-by-wire control is executed and the control is completed.

In the first embodiment, in order to determine whether the backup mechanism 7 is operating without any abnormality, the same torque value T is applied to the reaction motor 3 and the steered motor 5, and the detected values T1 and T2 of the steering side torque sensor 9 and the steered side torque sensor 12 are compared. If the error between T1 and T2 is within the predetermined range, it is determined that the torque transmission of the steering side and steered side can be carried out via the backup mechanism 7 without abnormality, and normal steer-by-wire control is executed. If the error is outside the predetermined range; more specifically, the torque transmission via the backup mechanism 7 is not carried out and the sum of the absolute value of the detected values T1 and T2 is 2T, then it is determined that the torque transmission via the backup mechanism 7 is not being carried out normally, and manual steering cannot be secured, and thus, the fail-safe process is carried out.

This allows detection of whether the backup mechanism 7 will operate securely, and consequently, a vehicle steering apparatus with improved safety can be provided. In addition, the steering wheel 1 is secured by the lock mechanism 30 and therefore the steering wheel will not rotate a large amount due to the initial monitoring, thereby alleviating driver anxiety.

The second embodiment is described with reference to FIG. 4. The basic structure is the same as in the first embodiment and therefore only the differences are described. The first embodiment is provided with a lock mechanism 30 and it is determined whether the relative error of detected values T1 and T2 of the steering side and steered side torque sensor 9 and 12 is within the predetermined value $\epsilon_T$. The second embodiment is different from the first embodiment in that the lock mechanism is not provided and initial monitoring is carried out based on the detected value T2 provided by the steered side torque sensor 12.

The control unit 14 according to the second embodiment is the same as that of the first embodiment except for the error detector 143. The error detector 143 according to the second embodiment is driven by the same torque amount T in the direction in which the torque of the reaction motor 3 and steered motor 5 offset each other. In other words, if the torque direction of the reaction motor 3 is positive, the reaction motor 3 generates torque T and the steered motor 5 generates torque −T.

At that time, the torque T2 that affects the rack 4 is detected by the steered side torque sensor 12. When there is no abnormality in the backup mechanism 7, the reaction motor 3 and the steered motor 5 generate the same torque and restrain each other's rotation. Therefore the rack 4 hardly rotates. Consequently, if the detected value T2 from the steered side torque sensor 12 is within the predetermined range, the backup mechanism 7 is determined to be normal. If T2 exceeds the predetermined range, it is determined that the torque of the steered motor 5 is not being transmitted to the steering shaft side and the backup mechanism 7 is determined to be in an abnormal condition.

In addition, by taking advantage of the fact that when there is no abnormality in the backup mechanism 7, the reaction motor 3 hardly rotates, and that it rotates during the abnormal condition, the abnormality can be detected when the detected value Ns of the steering angle sensor 8 is a predetermined value or greater. When rotation of the steering wheel 1 is detected, the torque T provided to each motor should be larger than the inertia of the steering wheel 1, so that rotation can be securely detected. The generation of the rotation angle is set within the range of ±10° as the steering angle, so that rotation can be securely detected without any anxiety for the driver.

In order to determine whether the backup mechanism 7 can operate without any abnormality, the error detector 143 carries out the initial monitoring control. In order to secure manual steering in case there is a failure while the vehicle is being parked, the electromagnetic clutch 6 is engaged when the ignition is turned off. In the second embodiment, an arbitrary torque T is generated at the reaction motor 3 and the same torque value T is generated at the steered motor 5.

If there is no abnormality in the backup mechanism 7, the transmission of the mobile power between the steering wheel 1 and rack 4 is carried out without abnormality and the reaction motor 3 and steered motor 5 generate the same torque and so constrain each other's rotation; therefore the steering shaft 2 and the rack hardly rotate (only when each other's motor rotation error is $\epsilon s$). Thus, if $\epsilon t$ is the predetermined error and the detected value T2 of the steered side torque sensor 12 is within the range of $-\epsilon t \leq T2 \leq \epsilon t$, and the detected value Ns of the steering angle sensor 8 is within the rotation error $\epsilon s$ of each of motors 3 and 5, then backup mechanism 7 is determined to be normal and the normal steer-by-wire control is executed.

When there is abnormality in the backup mechanism 7 and the mobile power is not transmitted from the steering wheel 1 to the rack 4, then all of the torque of the steered motor 5 is transmitted to the rack 4. This affects the steered torque sensor 12 and the detected value of torque T2 will exceed the error $\epsilon t$. In addition, the detected value Ns of the steering angle sensor 8 increases by exceeding the rotation error $\epsilon s$ of each of the motors 3 and 5.

Figure 5:
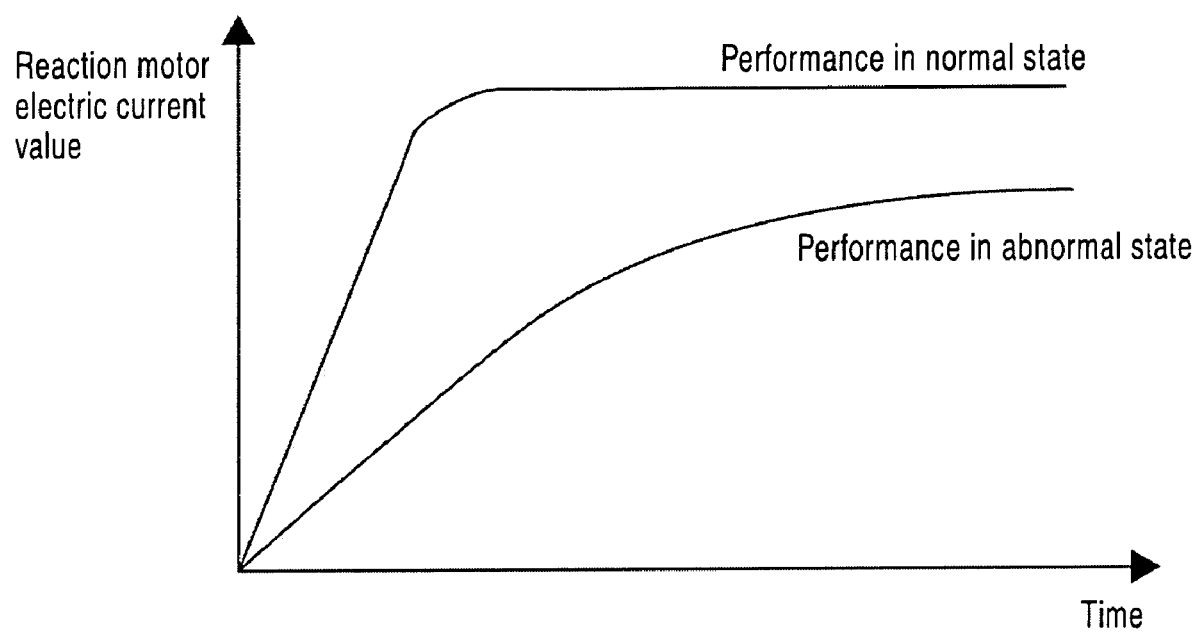
FIG. 5 is a chart showing the temporal transition of a reaction motor electric current value during normal and abnormal conditions.

In addition, in the normal condition the reaction motor 3 hardly rotates, and therefore the electric current value has a step waveform in which it starts at the same time as system startup. On the other hand, in an abnormal condition, the rotation of the reaction motor 3 is not restricted and therefore it has a delayed waveform in which the electric current value gradually increases (See FIG. 5). Here the steer-by-wire control is so structured that a target angle advanced from the current angle by the amount of the predetermined angle in the direction that the reaction is applied, as the control of the reaction motor and an electric current command value are calculated based on the deviation of the target angle and the current actual angle. In other words, because when the motor does not rotate the deviation is not eliminated, the electric current value rises at once. When the motor rotates, the deviation is appropriately eliminated and the electric current value gradually increases. When the motor is controlled by the torque control, etc., the torque can be estimated by detecting the transition of the electric current value for the portion of the back electromotive force along with the motor rotation.

Therefore, when the detected value T2 of the steered side torque sensor 12 exceeds the predetermined error ±$\epsilon t$ or the detected value Ns of the steering angle sensor 8 exceeds the rotation error $\epsilon s$ of each of the motors 3 and 5, then abnormality of the backup mechanism 7 is detected and fail-safe processing is carried out. In addition to the determination of T2, by detecting the delayed response of the electric value of the reaction motor 3, the reliability of the abnormality determination is improved.

Figure 4:
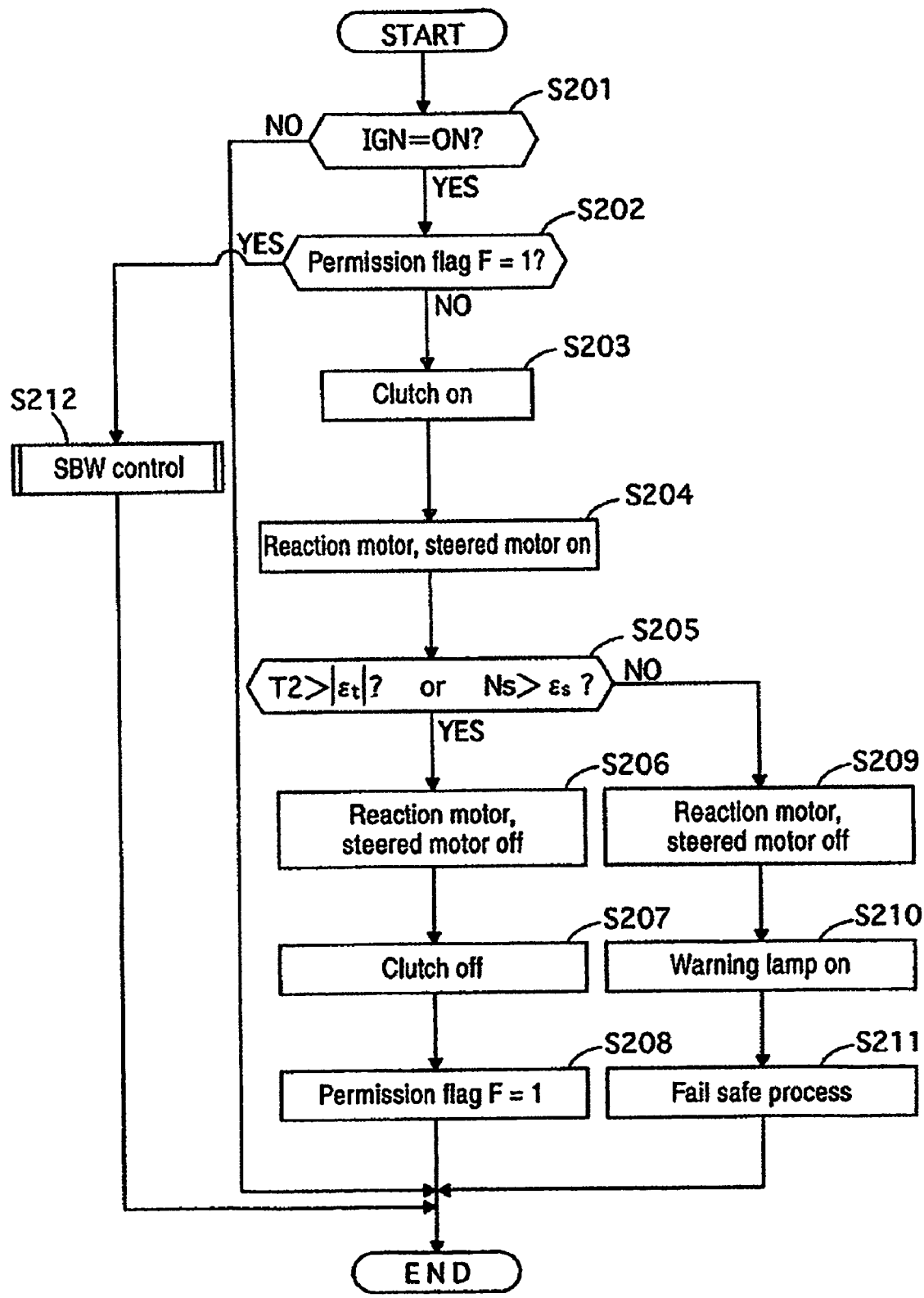
FIG. 4 is a flowchart showing the initial monitoring control process according to a second embodiment.

FIG. 4 is a flowchart showing the initial monitoring control process in accordance with the second embodiment. Each step is described as follows.

Steps S201 to S204 are the same as steps S101 to S104 according to the first embodiment.

At step S105, it is determined whether the detected value T2 of the steered side torque sensor 12 exceeds the threshold value $\epsilon t$, or whether the rotation angle Ns of the steering shaft 2 exceeds the threshold value $\epsilon s$. If it is YES, the process advances to step S206, and if it is NO, the process advances to step S209.

Steps S206 to S212 are the same as steps S106 to S112 according to the first embodiment.

In the second embodiment, the torque T2 that affects the rack 3 detects the normal/abnormal operation of the backup mechanism 7 by means of the steered side torque sensor 12. If the detected value T2 of the steered side torque sensor is within the range of $-\epsilon t \leq T2 \leq \epsilon t$, then the backup mechanism 7 is determined to be normal, and the normal steer-by-wire control is executed. If the detected value T2 of the steered torque sensor 12 exceeds the predetermined error ±$\epsilon t$ or if the detected value Ns of the steering angle sensor 8 exceeds the rotation error $\epsilon s$ for both motors 3 and 5, then the abnormality in the backup mechanism 7 is detected and the fail-safe process is carried out.

By doing so, the initial monitoring can be carried out without a lock mechanism. In the normal condition, an initial monitoring is allowed without moving the steering wheel 1, thereby not giving rise to anxiety in the driver. In principle, the initial monitoring can be carried out based on the detected value of the steered side torque sensor 12 only, and therefore a simple structure can be achieved, as compared to the first embodiment, which detects the torques of both the steering side and steered side. In addition, by detecting the delayed response of the electric In the second embodiment, the detected value T2 of the steered side torque sensor 12 was used for the determination; nonetheless, the rotation angle can be used for the determination. More specifically, when the speed reduction ratio of the steering side and steered side is r, if the steered motor 5 rotates through the rotation angle θ2, then the reaction motor 3 rotates θ2/r. Therefore, it is acceptable that the actual rotation angles θ1 and θ2 of the steering side and steered side are detected by the steering side and steered side resolvers 10 and 11, and the actual rotation angle θ1 of the reaction motor 3 and the rotation angle θ2/r; that is, the rotation of the steered side motor 5, are compared, and if the error is within the predetermined value, the backup mechanism 7 is determined to be normal.

Or the steered side motor 5 is rotated by θ1×r due to the actual rotation angle θ1 of the reaction motor 3. Therefore it is acceptable that the actual rotation angle θ2 of the steered side motor 5 and the rotation angle θ1×r; that is, the rotation of the reaction motor 3, are compared and the error is calculated.

In the second embodiment, because the steering shaft 2 is not provided with a lock mechanism, the steering wheel 1 rotates along with the rotation of the reaction motor 3, and the detection value at the steering side torque sensor 9 is 0 (in reality, torque used for the inertia of the steering wheel 1 is generated). Therefore, it is acceptable to carry out the initial monitoring control process by detecting the load torque T1 of the reaction motor 3 based on the electric current value of the reaction motor 3.

The third embodiment is described with reference to FIG. 6. The basic structure is the same as in the first embodiment and therefore only the differences are described. It is different in that, during the initial monitoring control according to the first embodiment, both the reaction motor and steered motor 5 are driven, while in the third embodiment, only the reaction motor 3 is driven. By detecting the torque T of the reaction motor 3 and making a comparison between the steering side and steered side torque sensors 9 and 12, the initial monitoring of the backup mechanism 7 is carried out.

When there is no abnormality in backup mechanism 7 and manual steering is secured, the torque of the reaction motor 3 is transmitted to each member on the steered side via the backup mechanism 7. Therefore in the third embodiment, when only the reaction motor 3 (or steered motor 5) is driven, the torque generated between the reaction motor 3 and the lock mechanism 30 can be detected. Consequently, when the detected values of the steering side and steered side torque sensors 9 and 12 are determined to be approximately the same, the backup mechanism 7 is determined to be normal.

More specifically, when only the reaction motor 3 is driven and the torque T2 detected by the steered side torque sensor 12 is the predetermined value or greater (the contortion of the reaction motor torque T is detected by two sensors, which are for the steering side and steered side, and the torque detected by the steered side torque sensor 12 is approximately T/2) then the error detector 143 determines that the torque transmission of the steering side and steered side can be effected via the backup mechanism 7 without abnormality, and the normal steer-by-wire control is performed. If T2 is less than the predetermined value, it is determined that the torque transmission via the backup mechanism 7 cannot be carried out normally, and therefore a fail-safe operation is performed, such as preventing the vehicle from starting or setting off an alarm device.

Figure 6:
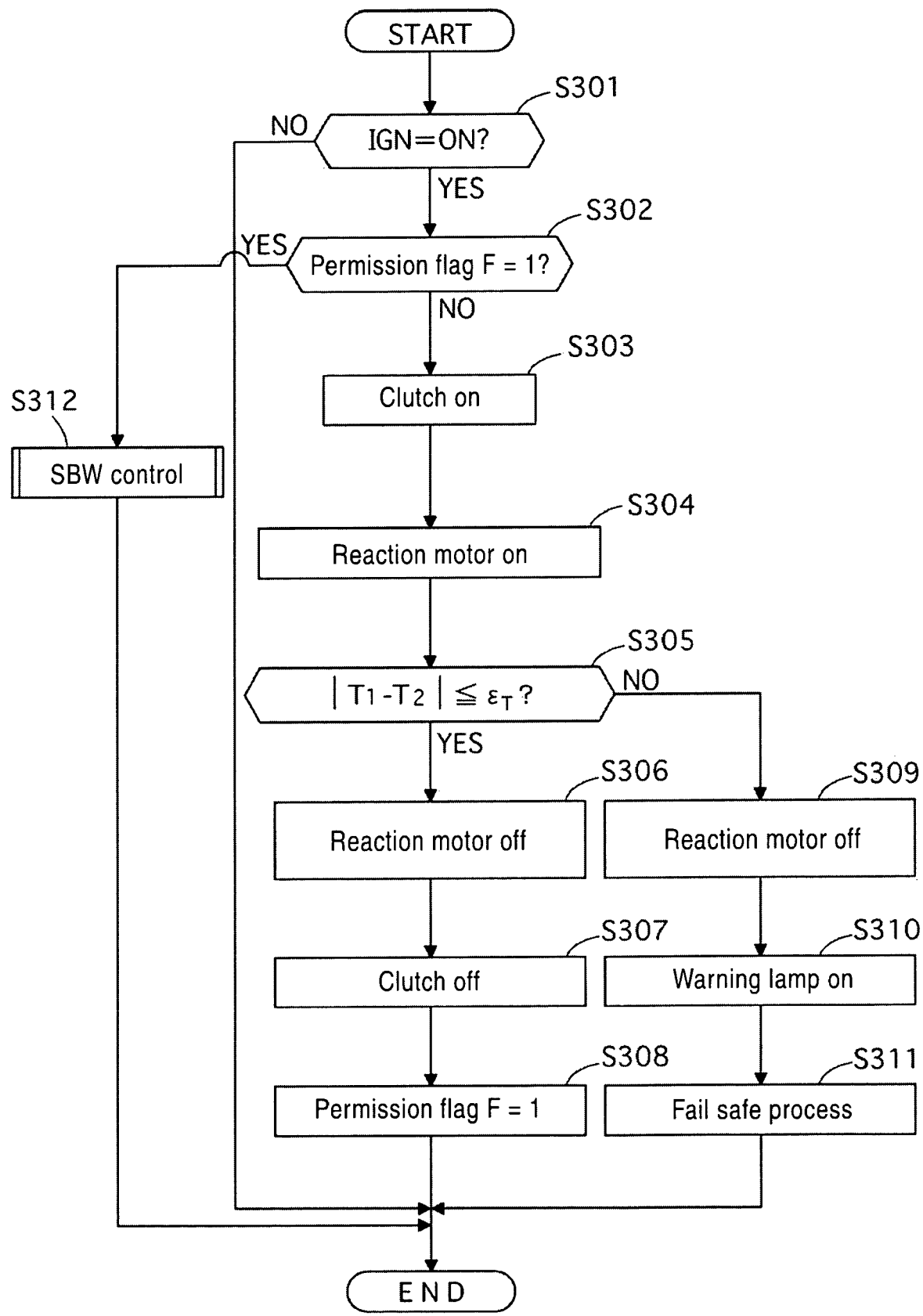
FIG. 6 is a flowchart showing the initial monitoring control process according to a third embodiment.

FIG. 6 is a flowchart showing the initial monitoring control process in accordance with the third embodiment. Steps S301 to S303 are the same as steps S101 to S103 in the first embodiment.

At step S304, only the reaction motor 3 is turned on and the process advances to step S305.

At step S305, it is determined whether the error of the torques T1 and T2 detected by the steering side and steered side torque sensors 9 and 12 is the predetermined value $\epsilon_T$ or less. If it is YES, the process advances to step S306, and if it is NO, the process advances to step S309.

At step S306 the reaction motor 3 is turned off and the process advances to step S307.

Steps S307 and S308 are the same as steps S107 and 108 of FIG. 3.

At step S309, the reaction motor 3 is turned off and the process advances to step S310.

Steps S310 to S312 are the same as steps S110 to S112 of FIG. 3.

In the third embodiment, only the reaction motor 3 is operated and if the error of the torques T1 and T2 detected by the steering side and steered side torque sensors 9 and 12 is less than or equal to the predetermined value $\epsilon_T$, then it is determined that the torque transmission between the steering side and steered side via the backup mechanism 7 is being carried out without abnormality, and the normal steer-by-wire control is executed. If the error is greater than the predetermined value $\epsilon_T$, it is determined that the torque value of the steering torque sensor 9 is output and the torque value of the steered torque sensor 12 is not output and therefore the torque transmission via the backup mechanism cannot be carried out normally. Therefore a fail-safe operation is performed, such as preventing the vehicle from starting or setting off an alarm device.

By doing so, compared to the first embodiment, in which the initial monitoring is carried out by operating both the reaction motor 3 and the steered motor 5, the initial monitoring of the backup mechanism 7 can be done with a simpler control.

The fourth embodiment is described with reference to FIG. 7. The basic structure is the same as in the second embodiment and the initial monitoring is carried out by the detected value T2 of the steered side torque sensor 12 without a lock mechanism. In the second embodiment, both the reaction motor 3 and the steered motor 5 are operated; but the fourth embodiment differs from the second embodiment in that only the reaction motor 3 is operated.

The control unit 14 in the fourth embodiment is the same as that in the first and second embodiments except for the error detector 143. The error detector 143 in the fourth embodiment operates only the reaction motor 3, and the torque T2 that affects the rack 4 is detected by the steered side torque sensor 12. As in the second embodiment, if the detected value T2 of the steered side torque sensor 12 is greater than the predetermined value, the backup mechanism 7 is determined to be normal. If it is equal to or less than the predetermined value (for example, 0), it is determined to be abnormal.

As in the second embodiment, it is acceptable to take advantage of the fact that if there is no abnormality in the backup mechanism 7, the reaction motor 3 hardly rotates, and because it rotates during the abnormal condition, the abnormality can be detected when the detected value Ns of the steering angle sensor 8 becomes greater than the predetermined value.

When the backup mechanism has no abnormality, the mobile power is normally transmitted between the steering wheel 1 and the rack 4, and the torque of the reaction motor 3 is transmitted from the rack 4 to the steered wheel 20. Therefore, the rotation of the reaction motor is constrained. In order to avoid steering the steered wheel 20 during the initial monitoring, the generated torque at the reaction motor 3 should have a magnitude that will not steer the steered wheel 20.

The reaction motor 3 adds torque to the rack 4 while its rotation is restricted, and therefore contortion generated at the steered side torque sensor 12 and the detected value Ns of the steering angle sensor 8 is hardly changed. (The change in Ns is only the portion from the contorted angle ∈s of the steered side torque sensor 12). Consequently, if the detected value T2 of the steered side torque sensor 12 is positive, the backup mechanism 7 is determined to be normal and the normal steer-by-wire control is executed.

If abnormality occurs in the backup mechanism 7 and the mobile power is not transmitted from the steering wheel 1 to the rack 4, all the torque of the reaction motor 3 is transmitted to the steering shaft, and the steered side torque sensor 12 is not affected. Therefore torque T2 becomes zero and the detected value Ns of the steering angle sensor 8 increases by exceeding the contortion angle ∈s of the steered side torque sensor 12. In addition, as in the second embodiment, in the normal condition the reaction motor 3 hardly rotates and therefore the electric current value has a step waveform, in which it starts up at the same time as the system starts. On the other hand, in the abnormal condition, the rotation of the reaction motor 3 is not constricted and therefore it has a delayed waveform in which the electric current value gradually increases (See FIG. 5).

Therefore, if the detected value T2 of the steered side torque sensor 12 is 0 or the detected value Ns of the steering angle sensor 8 exceeds the contortion angle s of the steered side torque sensor 12, then abnormality in the backup mechanism 7 is detected and the fail-safe process is carried out. In addition, by detecting the delayed response of the electric current value of the reaction motor 3 in addition to the determination of T2 and Ns, the reliability of the abnormality determination can be improved.

Figure 7:
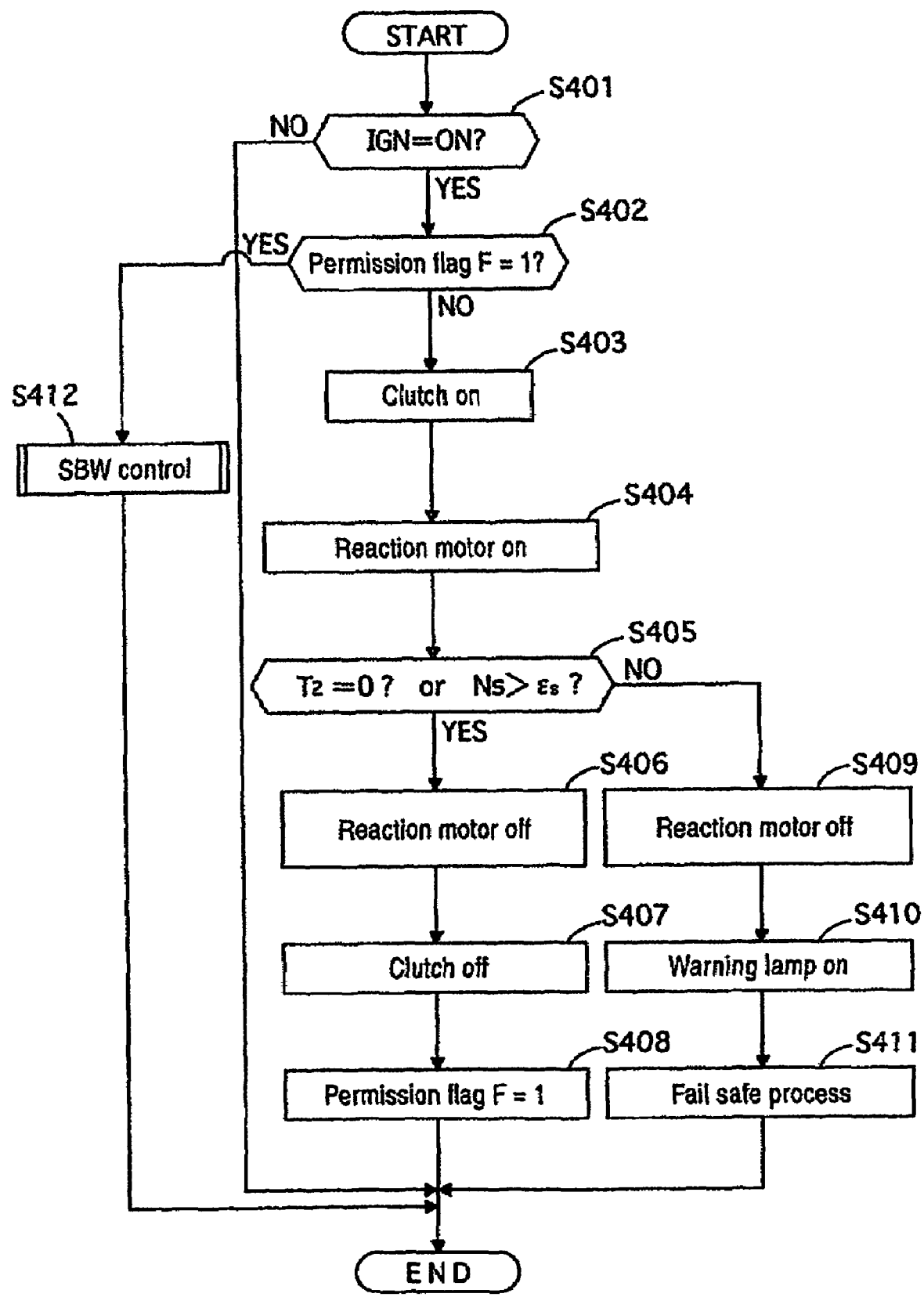
FIG. 7 is a flowchart showing the initial monitoring control process according to a fourth embodiment.

FIG. 7 is a flow chart showing the initial monitoring control process according to the fourth embodiment. Each step is described as follows.

Steps S401 to S404 are the same as steps S101 to S104 in the first embodiment.

At step S405, it is determined whether the detected value T2 of the steered side torque sensor 12 is 0 or the rotation angle Ns of the steering shaft 2 exceeds the threshold value ∈s. If it is YES, the process advances to step S406 and if it is NO, the process advances to step S409.

Steps S406 to S412 are the same as steps S106 to S112 in the first embodiment.

The error detector 143 according to the fourth embodiment operates only the reaction motor 3, and if the detected value T2 of the steered torque sensor 12 is positive, the backup mechanism 7 is determined to be normal and the normal steer-by-wire control is executed. If the detected value T2 of the steered torque sensor 12 is zero or the detected value Ns of the steering angle sensor 8 exceeds the contortion angle ∈s of the steered side torque sensor 12, abnormality in the backup mechanism 7 is detected and the fail-safe process is carried out.

By doing so, the initial monitoring is carried out only with the reaction motor 3 operation, and consequently the effect of the second embodiment can be achieved with a simpler structure.

The fifth embodiment is described with reference to FIG. 8. The basic structure is such that, as in the third embodiment, a lock mechanism 30 is provided and the steering side and steered side torques are compared. However, while only the reaction motor 3 is operated in the third embodiment, in the fifth embodiment the initial monitoring is carried out by operating only the steered motor 5.

Figure 8:
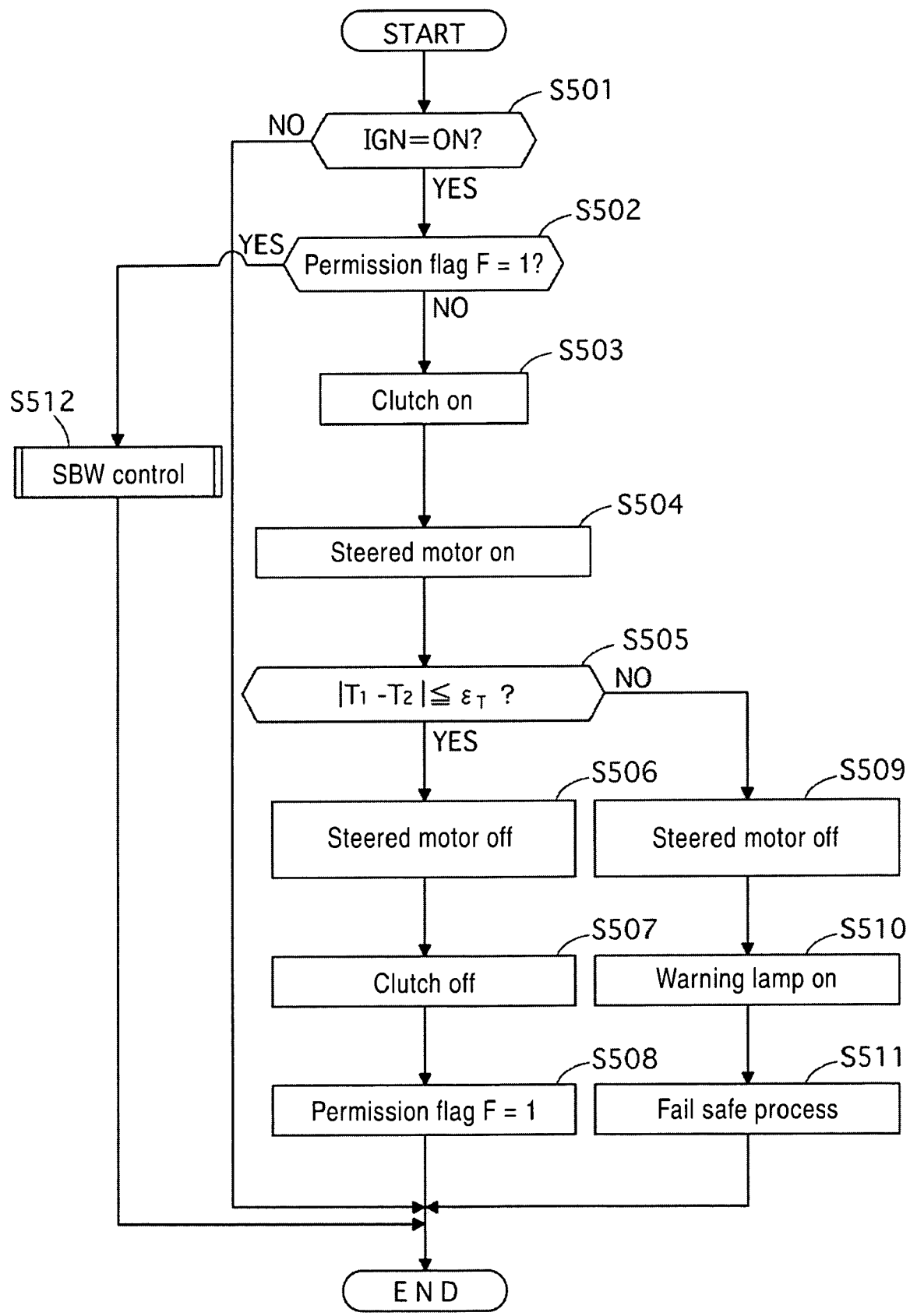
FIG. 8 is a flowchart showing the initial monitoring control process according to a fifth embodiment.

FIG. 8 is a flow chart showing the initial monitoring control process in the fifth embodiment.

Steps S501 to 503 are the same as steps S101 to S103 in the first embodiment.

At step S504, only the steered motor 5 is turned on and the process advances to step S505.

At step S505, it is determined whether the error of the torques T1 and T2 detected by the steering side and steered side torque sensors 9 and 12 is the predetermined value $\epsilon_T$ or less. If it is YES, the process advances to step S506 and if it is NO, the process advances to step S509.

At step S506, the steered motor 5 is turned off and the process advances to step S507.

Steps S507 and S508 are the same as steps S107 and 108 of FIG. 3.

At step S509, the steered motor 5 is turned off, and the process advances to step S510.

Steps S510 to S512 are the same as steps S110 to S112 of FIG. 3.

In the fifth embodiment, only the steered motor 3 is operated and if the error of the torques T1 and T2 detected by the steering side and steered side torque sensors 9 and 12 is within the predetermined range (for the steered motor torque T, the contortion is detected using two torque sensors at the steering side and steered side, and the torque detected by each of the torque sensors 9 and 12 becomes approximately T/2) then it is determined that the torque is being normally transmitted between the steering side and steered side via the backup mechanism 7, and the normal steer-by-wire control is executed. If it is outside the predetermined range, it is determined that the torque transmission via the backup mechanism 7 is cannot be carried out normally, and the fail-safe process is carried out as in the other embodiments.

By doing so, as in the third embodiment, compared to the first embodiment that carries out the initial monitoring by operating both the reaction motor 3 and steered motor 5, the initial monitoring of the backup mechanism 7 can be carried out with a simpler control. By employing the third or fifth embodiment, depending on the automobile design, the initial monitoring of the backup mechanism 7 can be easily carried out by operating either the steering side or steered side motors 3 or 5.

The sixth embodiment is described with reference to FIG. 9. The basic structure is the same as in the second embodiment and therefore only the differences are described. In the second embodiment, both the reaction motor 3 and steered motor 5 are operated. The sixth embodiment differs from the second embodiment in that only the steered motor 5 is operated, and by detecting and comparing the rotation angles θ1 and θ2 of the reaction motor 3 and steered motor 5, the initial monitoring is carried out.

If there is no abnormality in the backup mechanism 7, when the steered motor 5 is rotated while the electromagnetic clutch 6 is engaged, the rotation is transmitted to the reaction motor 3 via the backup mechanism 7. At this time, if the speed reduction ratio of the steering side and steered side is r, then the rotation angle of the reaction motor 3 relative to the rotation angle θ2 of the steered motor 5 is θ2/r.

Therefore, in the sixth embodiment, the steered motor 5 is operated and it is determined whether the angle θ2/r of the reaction motor 3 via the backup mechanism 7 is rotated to the predetermined value Nθ2 or greater.

If the angle θ2/r is the predetermined value Nθ2 or greater, it is determined that the torque transmission between the steering side and steered side via the backup mechanism 7 is being carried out normally, and the normal steer-by-wire control is executed. If it is less than the predetermined value Nθ2, then the fail-safe process is carried out such as in the other embodiments. It is acceptable that the angle of rotation of the steered motor 5 is detected and compared by operating only the reaction motor 3. In the first to fifth embodiments, torque T generated by each of the motors is configured within a range such that the steered wheels 20 are not steered. In FIG. 6, a torque that can steer the steered wheels 20 is added and the initial monitoring control is carried out based on the changes in the actual steered angle and steering angle.

Figure 9:
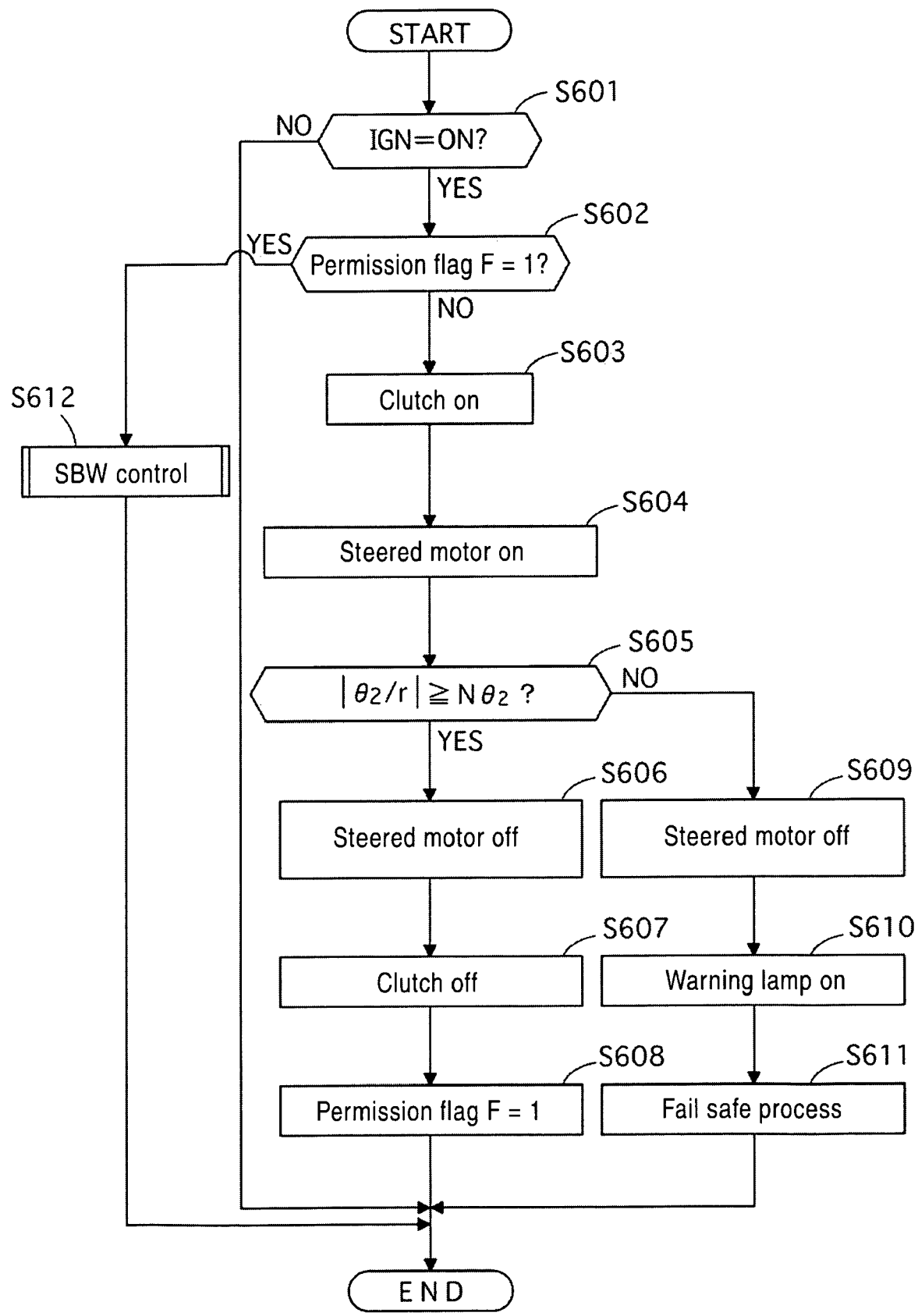
FIG. 9 is a flowchart showing the initial monitoring control process according to a sixth embodiment.

FIG. 9 is a flow chart showing the initial monitoring control process according to the sixth embodiment.

Steps S601 to S603 are the same as steps S101 to S103 in the flow chart of FIG. 3.

At step S604, only the steered motor 5 is turned on and the process advances to step S605.

At step S605, it is determined whether the angle θ2/r that is the rotation of the reaction motor by the rotation of the steered motor 5 is the predetermined value Nθ2 or greater. If it is YES, the process advances to step S606, and if it is NO, the process advances to step S609.

At step S606, the steered motor 5 is turned off and the process advances to step S607.

Steps S607 and S608 are the same as steps S107 and 108 of FIG. 3.

At step S609, the steered motor 5 is turned off and the process advances to step S610.

Steps S610 to S612 are the same as steps S110 to S112 of FIG. 3.

In the sixth embodiment, the steered motor 5 is rotated first, and the predetermined value Nθ2 that corresponds to the rotation angle θ2 of this steered motor 5, and the rotation angle θ1 of the reaction motor 3 that is rotated via the backup mechanism 7 are compared, and it is determined whether the angle θ2/r of the rotation of the reaction motor 3 due to the rotation of the steered motor 5 is the predetermined value Nθ2 or greater.

If Θ2/r is the predetermined value Nθ2 or greater, it is determined that the torque transmission between the steering side and the steered side via the backup mechanism 7 can be carried out normally and the normal steer-by-wire control is executed. If it is less than the predetermined value Nθ2, then it is determined that the torque transmission via the backup mechanism 7 cannot be carried out normally, and the fail-safe process is carried out as in the other embodiments.

Initial monitoring is carried out by using an inexpensive rotation sensor and therefore cost can be reduced. In addition, by combining with initial monitoring, depending on the vehicle, the effect of the first to third embodiments can also be obtained.

Initial monitoring can be carried out based on the steering angle sensor 8; that is, the rotation angle of the steering shaft 2 closer to the driver instead of the motor rotation angle. By doing so, whether manual steering is secured can be monitored even more securely.

The initial monitoring process has been described based on the first to six embodiments. By combining embodiments, depending on the vehicle, the reliability of the initial monitoring can be further improved.

The present vehicle steering apparatus has been described by referring to six embodiments. Nonetheless, the detailed structure is not limited to these embodiments, and design changes and modifications are permitted, as long as they do not exceed the scope of the appended claims.

For example, in the embodiments described, an electromagnetic clutch is used; nonetheless, a friction-type clutch can be used. In addition, in the first embodiment, torque is added to each of the steering side and steered side motors in directions such that each of the torques offset each other, and whether the backup mechanism is normal/abnormal is determined based on the error value of the detected value of the steering side and steered side torque sensors. Nonetheless, the normal/abnormal condition can be determined by the rotation angles of the steering side and steered side.

In addition in the embodiments described, the normal/abnormal condition of the backup mechanism is determined when the ignition is turned on. Nonetheless, it can be determined when the power of the steer-by-wire system is turned on, and initial monitoring can be started by turning the power on at the release of the door lock and opening of the door at the driver's side.

What is claimed is:

1. A vehicle steering apparatus of which a steering wheel and steered wheels can be separated mechanically comprising:
    a steering shaft connected to the steering wheel operable by a driver;
    a reaction actuator connected to the steering shaft for adding a reaction force;
    a rack that steers the steered wheels;
    a steering actuator provided on the rack, the steering actuator steering the steered wheels according to a control signal;
    a backup mechanism for connecting and disconnecting the steering shaft and the rack via a clutch;
    first detection means for detecting the condition of the steering shaft;
    second detection means for detecting the condition of the rack; and
    backup operation monitoring means for testing the backup mechanism, wherein the backup operation monitoring means determines whether the backup mechanism is functioning properly based on a value detected by at least one of the first detection means or the second detection means while the clutch is connecting and torque is applied to the backup mechanism by at least one of the steering actuator or the reaction actuator.

2. A vehicle steering apparatus according to claim 1, further including a lock mechanism for arresting rotation of the steering shaft.

3. A vehicle steering apparatus according to claim 1, wherein the backup operation monitoring mechanism selectively assumes normal operation when the torque detected by the second detection mechanism is at a predetermined value or greater, and selectively assumes abnormal operation when the torque so detected is lower than the predetermined value.

4. A vehicle steering apparatus according to claim 1, wherein the backup operation monitoring mechanism selectively assumes normal operation when the steering angle detected by the first detection mechanism is at a predetermined value or greater, and selectively assumes abnormal operation when it is lower than the predetermined value.

5. A vehicle steering apparatus according to claim 1, wherein the first detection mechanism selectively detects the torque between the steering wheel and the reaction actuator.

6. A vehicle steering apparatus according to claim 5, wherein the reaction actuator is an electric motor, and the first detection mechanism selectively detects the torque of the steering shaft based on the electric current value of the electric motor.

7. A vehicle steering apparatus according to claim 1, wherein the second detection mechanism selectively detects the torque between the rack and the steering actuator.

8. A vehicle steering apparatus according to claim 7, wherein the steering actuator is an electric motor and the second detection mechanism selectively detects the torque of the rack based on the electric current value of the electric motor.

9. A vehicle steering apparatus comprising:
a steering shaft connected to a steering wheel;
a reaction actuator connected to the steering shaft and adding a reaction force;
a rack for steering a steered wheel;
a steering actuator provided on the rack;
a backup mechanism for connecting and disconnecting the steering shaft and the rack via a clutch, the clutch being engaged when a power source for the steering apparatus is deenergized;
a first detection mechanism for detecting the condition of the steering shaft;
a second detection mechanism for detecting the condition of the rack; and
a backup operation monitoring mechanism for testing whether torque is transferred across the backup mechanism while the clutch is connecting in response to an applied torque that is provided to the backup mechanism by at least one of the steering actuator or the reaction actuator based on a value measured by at least one of the first detection mechanism or the second detection mechanism.

10. A vehicle steering apparatus according to claim 9, further including a lock mechanism for arresting rotation of the steering shaft.

11. A vehicle steering apparatus according to claim 9, wherein the backup operation monitoring mechanism selectively assumes normal operation when the torque detected by the second detection mechanism is at a predetermined value or greater, and selectively assumes abnormal operation when the torque so detected is lower than the predetermined value.

12. A vehicle steering apparatus according to claim 9, wherein the backup operation monitoring mechanism selectively assumes normal operation when the steering angle detected by the first detection mechanism is at a predetermined value or greater, and assumes an abnormal operation when it is lower than the predetermined value.

13. A vehicle steering apparatus according to claim 9, wherein the first detection mechanism selectively detects the torque between the steering wheel and the reaction actuator.

14. A vehicle steering apparatus according to claim 13, wherein the reaction actuator is an electric motor, and the first detection mechanism selectively detects the torque of the steering shaft based on the electric current value of the electric motor.

15. A vehicle steering apparatus according to claim 9, wherein the second detection mechanism selectively detects the torque between the rack and the steering actuator.

16. A vehicle steering apparatus according to claim 15, wherein the steering actuator is an electric motor and the second detection mechanism selectively detects the torque of the rack based on the electric current value of the electric motor.

17. A vehicle steering apparatus comprising:
a steering wheel operable by a driver;
a steering wheel operation sensor that detects an operated condition of the steering wheel operated by the driver;
steered wheels;
a clutch provided between the steering wheel and the steered wheels, that clutch engaging or disengaging between the steering wheel and the steered wheels;
a reaction actuator connected to the steering wheel, the reaction actuator generating a reaction force;
a steering actuator provided to steer the steered wheels according to the operated condition of the steering wheel; and
backup operation monitoring means for testing whether torque is transferred across the clutch and torque is provided to the clutch by at least one of the reaction actuator or the steering actuator.

* * * * *